Oct. 14, 1952 W. A. BODEN 2,613,711
APPARATUS FOR PREPARING CITRUS FRUIT
Filed Aug. 30, 1948 4 Sheets-Sheet 1

*INVENTOR.*
WENDELL A. BODEN

BY

ATTORNEYS

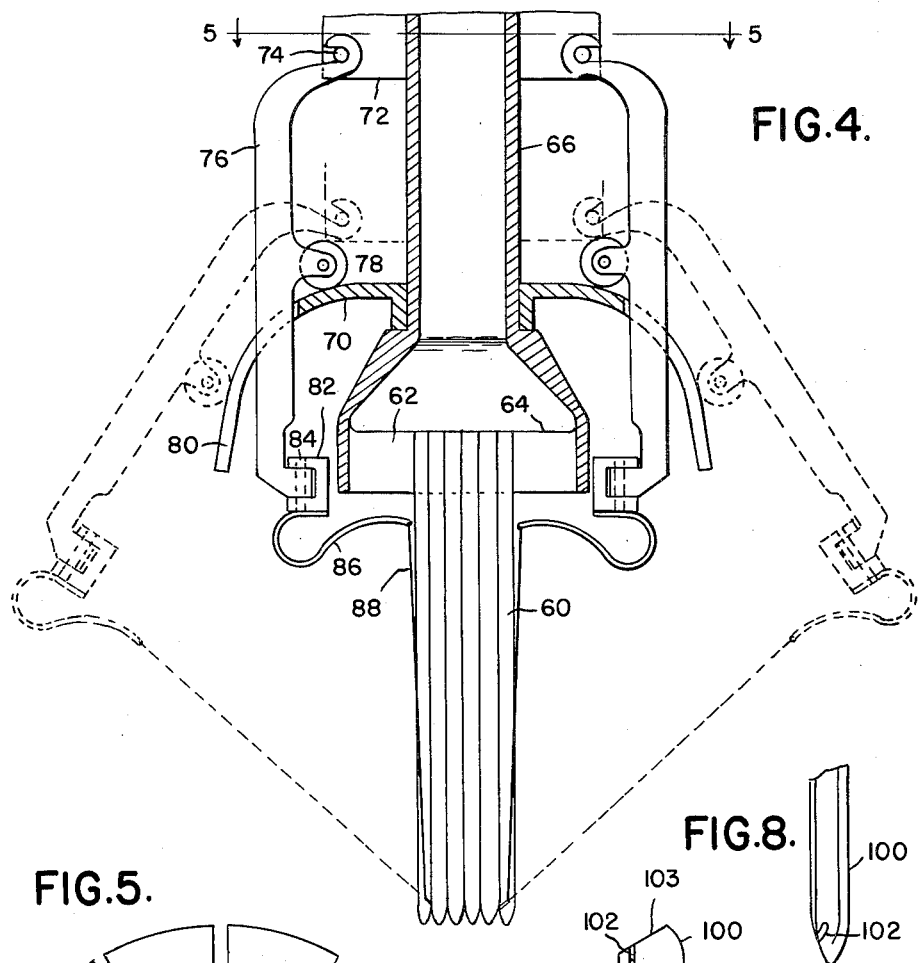
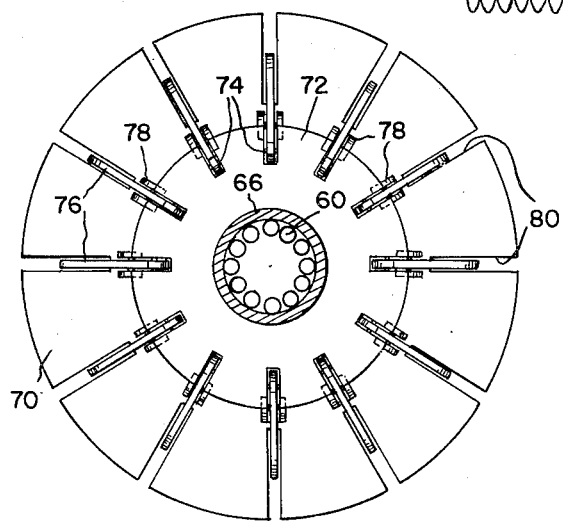

Oct. 14, 1952 W. A. BODEN 2,613,711
APPARATUS FOR PREPARING CITRUS FRUIT
Filed Aug. 30, 1948 4 Sheets-Sheet 3
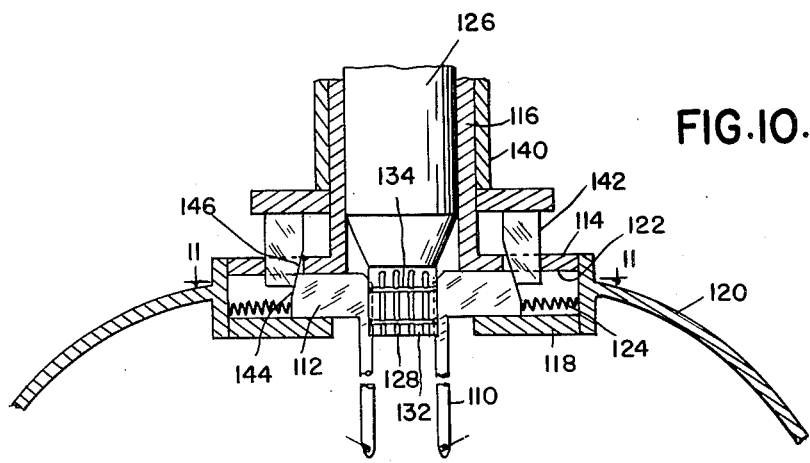
FIG.10.
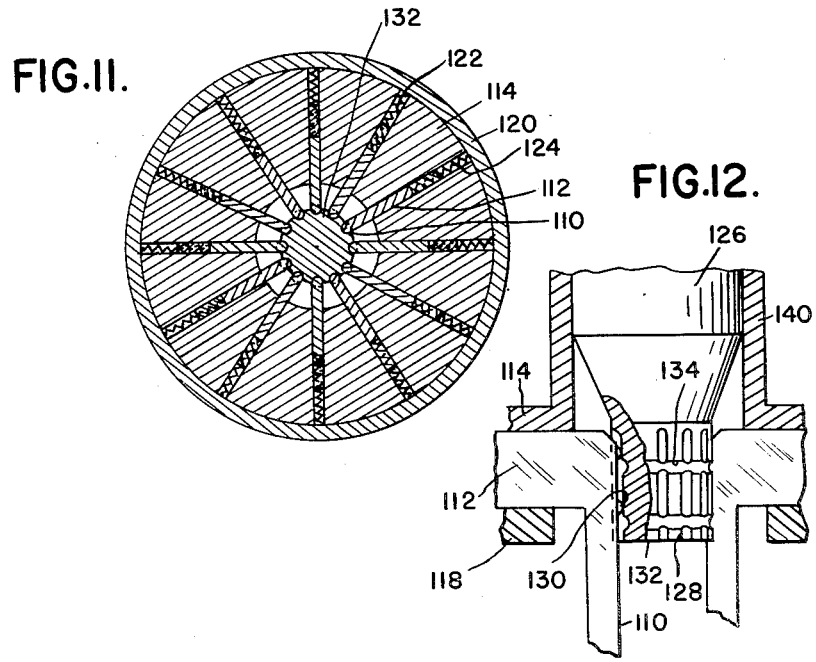
FIG.11.
FIG.12.
*INVENTOR.*
WENDELL A. BODEN
BY
ATTORNEYS

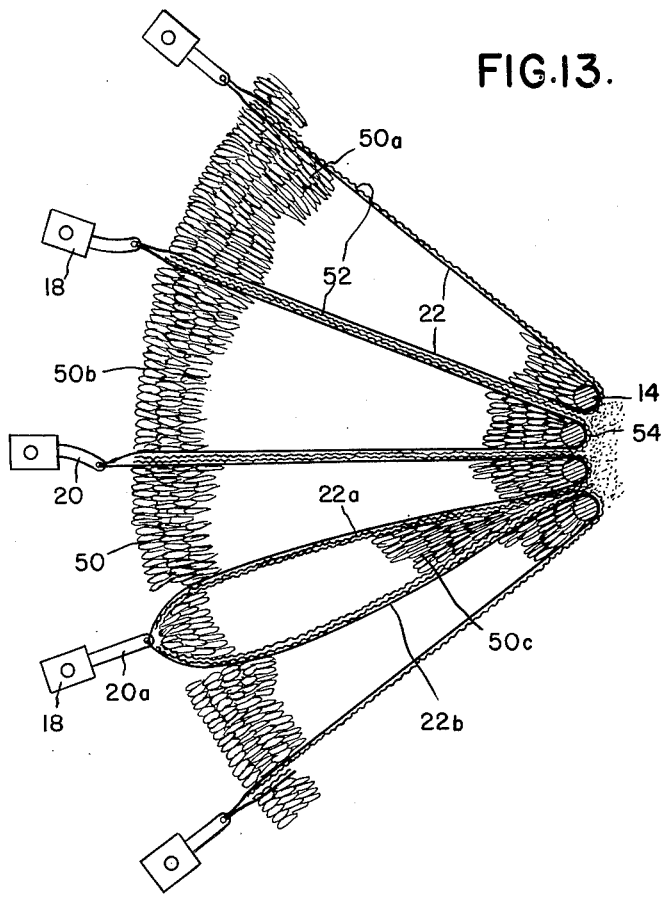

Patented Oct. 14, 1952

2,613,711

UNITED STATES PATENT OFFICE 2,613,711

APPARATUS FOR PREPARING CITRUS FRUIT

Wendell A. Boden, Detroit, Mich.

Application August 30, 1948, Serial No. 46,872

33 Claims. (Cl. 146—3)

The present invention relates to apparatus for preparing citrus fruit and more particularly to apparatus for separating segmental juice cell groups from radially extending membranes, and is in part a continuation of my prior copending application Serial No. 779,562, filed October 13, 1947.

There is a considerable demand for segmented citrus fruit. Prior to the present invention no completely satisfactory apparatus has been available for removing the sections from citrus fruit.

In order to fully appreciate the operation of the present apparatus it is necessary to understand the structural makeup of citrus fruit. Citrus fruit is composed of a plurality of segments, each segment being enveloped in a continuous membrane made up of radially extending portions and an outer portion. Within the membrane is a continuous segmental juice cell group which may or may not contain one or more seeds. If seeds are present they are located closely adjacent to the apex of the segment. The membrane which surrounds each juice cell group is attached to a central core extending through the fruit. The entire fruit is of course covered with a skin or rind.

In preparing fruit for the separation of the segmental juice cell groups, the first step is to treat the fruit by knife, chemical, and/or other means, in such a manner as to remove the rind and also the outer exposed portion of the membrane. This leaves an assembly of segmental juice cell groups each of which is separated in radial planes by a pair of radially extending membranes. In other words, each juice cell group is then supported in the fruit solely by its adherence or connection to the radially extending membranes. In accordance with the present invention, means are provided for simultaneously separating segmental juice cell groups from the radial membranes, which permits the thus separated juice cell groups to fall free from the core and its attached membranes. The operation is performed in a manner to cause some of the seeds to be retained with the core and radial membrane assembly. Citrus fruit seeds are normally attached to the membrane at the apex by a thread-like member or filament. Some of the seeds are pushed outwardly by the needles, breaking this filament. When the segments are finally separated, these seeds may fall free or be removed by hand from the segments. By having the needles arranged to perform this function, it is possible to locate them extremely close to the apices of the segments, and thus the entire segmental juice cell is separated with substantially no loss.

It is an object of the present invention to provide improved apparatus for removing segmental juice cell groups from citrus fruit. It is a further object of the present invention to provide an apparatus effectively to remove the segmental juice cell groups simultaneously from a citrus fruit. It is a further object of the present invention to provide improved apparatus for removing segmental juice cell groups from citrus fruit, which apparatus is characterized by its efficiency, by the fact that it reduces damage or breakage of the segmental juice cell groups to the minimum, by the fact that the apparatus operates to remove segmental juice cell groups simultaneously and by its ability to handle a large volume of fruit in a short time.

It is a feature of the present invention to provide for the separations of segmental juice cell groups from radial membranes by employing a pair of elongated separating portions adapted to be positioned in each juice cell segment parallel to and closely adjacent the apex of the segment, in combination with means for moving the portions outwardly in generally radial planes. It is a further feature of the present invention to provide apparatus of the character described in which the separating portions are supported adjacent the free ends of needles which are adapted to pierce the fruit. It is a further feature of the present invention to provide apparatus of the character described in which the separating portions are formed of wire. It is a further feature of the present invention to provide apparatus of the character described in which the wire separating portions are maintained under tension, are swung outwardly in arcs centered adjacent the point of attachment of the wire portions to the supporting needles and in which means are provided for permitting movement of the movable ends of the separating portions laterally of the radial plane so as to cause the separating portions to follow the radial membranes.

It is a further feature of the present invention to provide means for supporting the citrus fruit which comprises a plurality of parallel needles disposed in an annular array in combination with means for effecting radial in and out movement of the needles and more particularly to position the needles in one or more predetermined positions, one of these being an innermost position in which the needles grip the core of the fruit and the radial membranes, the second position being a slightly outwardly spaced position which permits passage of the radial membranes through the space between adjacent needles, the third position being an outermost position which facilitates removal of the fruit core, and attached radial membranes.

Other objects and features of the invention will become apparent as the description proceeds, particularly when taken in conjunction with the accompanying drawings in which:

Figure 4 is a fragmentary vertical section through a modified construction.

Figure 5 is a fragmentary section of the line 5—5 Figure 4.

Figure 6 is a fragmentary elevation of one form of needles.

Figure 7 is a view similar to Figure 6 illustrating a somewhat different form of needle.

Figure 8 is a view similar to Figure 6 illustrating yet another form of needle.

Figure 9 is a bottom plan view of the needle shown in Figure 8.

Figure 10 is a fragmentary section illustrating means for effecting radial adjustment of the needles together with means for expelling the fruit, core, and attached radial membranes.

Figure 11 is a fragmentary section of the line 11—11 Figure 10 with parts omitted for clarity.

Figure 12 is a fragmentary sectional view illustrating the manner in which the separating elements operate; and Figure 13 is a diagrammatic view illustrating the operation of the present invention.

Figure 1:
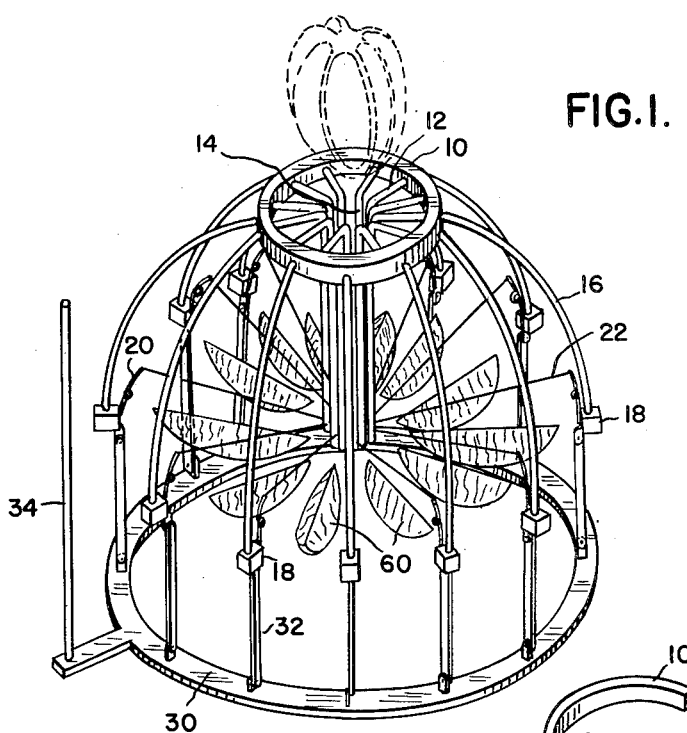
Figure 1 is a fragmentary perspective view of the apparatus.

Referring now to Figure 1, the apparatus comprises an annular supporting ring 10 to which are secured radially extending portions 12 of a plurality of needles 14. The major portion of the needles 14 are parallel to each other and are disposed in an annular array. The number of needles provided is selected to correspond to the average number of segments of the citrus fruit to be operated upon.

In all embodiments of the invention the cutting or separating elements constitute wires secured at or adjacent the ends of the needles which penetrate the fruit segments. This is an important feature of the present invention and contributes largely to the successful operation of the device in practical use. The needles serve the double function of providing elements for retaining the membranes in position while the separating elements move radially outward. Another important function of the needles is to provide piercing elements adapted to draw the separating portions of the wires through the fruit segments, while at the same time avoiding the possibility of piercing the intervening membranes, which might occur if each needle were associated with a pair of separate separating elements such as pointed knives.

Extending outwardly from the annular ring 10 are a plurality of generally arcuate guide arms 16 which if desired may be interconnected at their outer ends. As illustrated, however, guide arms 16 are designed to have sufficient rigidity so that additional supporting means at their outer ends are unnecessary.

Mounted on the guide arms 16 are movable members 18, each of which is provided with a resilient spring arm or the like 20. Alternatively, guide arms 16 may be somewhat resilient or mounted resiliently, so as to maintain separating elements 22 under tension and to permit lateral movement thereof during outward swinging.

As best seen in Figures 6 through 9, the needles are provided with eyes or slots adjacent their free ends. Elongated separating portions are supported adjacent the free ends of the needles and are connected at their opposite ends to the movable members 18 or more specifically to the springs or the like 20 which are carried by the members 18. While these separating portions may take different forms, it is preferred to employ wire portions 22 which may be in the form of metal strands. If desired, each wire portion intermediate the free end of a needle 14 and a cooperating movable member 18 may be a separate element suitably secured to the needle and movable member. Alternatively, the separating portions 22 may be provided by V-shaped wires secured at their ends to adjacent needles 14 and at their mid portion to a single movable member 18, or vice versa. However, it is also possible to provide the separating portions 22 by employing an elongated wire which is threaded through the eyes or slots of the needles and through correspondingly formed portions on the springs 20.

Figure 2:
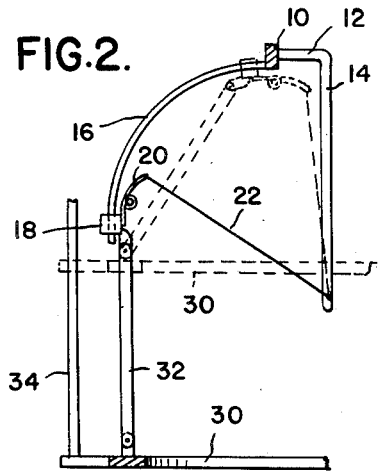
Figure 2 is a fragmentary vertical section through the apparatus.

The arcuate guide arms (not described up to this point) have a center of curvature substantially adjacent to the free ends of the needles. Accordingly as the movable members 18 are moved from an upper position adjacent to the supporting ring 10 to the lower position illustrated in full lines in Figure 2, the separating portions 22 are maintained under tension as a result of the use of the spring arms 20. Moreover since the spring arms 20 are capable of lateral deflection, they insure that the separating portion 22 shall follow along in contact with the inner surface of the radial membranes rather than passing outwardly through the juice cell groups and pulling the fruit apart.

Suitable means are provided for effecting outward swinging of all of the separating portions 22 simultaneously. This means may take the form of a ring 30 having a plurality of links 32 pivoted thereto and connected with the upper ends to the movable members 18. Suitable means (not shown) are provided to effect vertical movement of the ring 30 and this means may be interconnected thereto by means of one or more rods as illustrated at 34.

Figure 3:
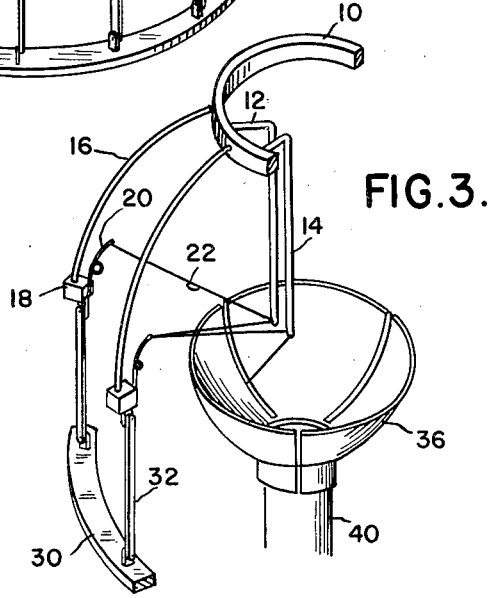
Figure 3 is a fragmentary perspective of the apparatus showing additional structure which is omitted from Figure 1 for the purpose of improving the clarity of the disclosure.

Referring now to Figure 3, there is shown a supporting cup 36 which is shown as segmental and which may be provided with suitable means for effecting a clamping motion between the several segments so as to grip a citrus fruit preparatory to the separating operation. In this figure there is also shown a plunger 40 which is adapted for vertical movement and which may be employed to expel the fruit core and attached radial membranes from the device. The fruit core and attached radial membranes are shown in dotted lines in Figure 1 in the position to which they are moved by upward movement of the plunger 40 through the space between the needles 14.

Referring now to Figure 13, the relationship between the segmental juice cell groups, the radial membranes, the needles 14, and the separating portions 22 is illustrated. In this figure a segmental juice cell group is indicated at 50. Each segmental juice cell group is surrounded by two radial membranes 52 which are interconnected at their apex as indicated at 54. Each of the needles 14 has a pair of separating portions 22 connected thereto. A single movable member 18 is connected through its spring 20 to the adjacent ones of the separating portions 22 carried by two adjacent needles 14. Accordingly the pair of separating portions 22 which are interconnected to the movable member 18 are adapted to separate the adjacent juice cell groups 50a, 50b, etc., from the pair of radial membranes 52 which extend therebetween. In other words, the pair of separating portions 22 which are connected to a single needle 14 is adapted to separate a complete juice cell group such as 50a from the two radial membrane portions which surround it. The juice cell group 50b is wider than cell 50a, and arm 20 is shown as laterally deflected to accommodate this wider segment. The juice cell group 50c is illustrated as one which is missed by a needle 14. It will be observed that separating elements 22a and 22b have bowed around segment 50c, this action being permitted by flexing of spring arm 20a inwardly, and the flexibility of the separating portions.

This is an important feature of the invention because the number of segments in each fruit varies and it has been impossible heretofore to overcome this irregularity of the fruit. This is clearly shown in Fig. 13 wherein as seen the segment 50c is not penetrated by a needle and therefore will not be removed from the fruit. While only one segment, 50c, is missed by a needle in the illustration, in actual practice there may be two or three segments which are not penetrated by a needle and removed from the fruit depending on the number of segments each fruit contains.

In the operation of the apparatus as thus far described, a citrus fruit, for instance a grapefruit is first peeled and/or treated to remove the rind and the outer membrane portion, thus leaving the radial membrane portions in place between adjacent juice cell groups. The fruit is then placed upon the supporting cup 36 with its core extended vertically in parallelism with the assembly of needles 14. The needles 14 are arranged in an annular array of such diameter that they will surround the core of the fruit and enter the segments very close to their apices. At this time the separating portions 22 are in their upper position, approaching parallelism with the needles 14. The needles 14 are then caused to penetrate the fruit either by raising the cup 36 relative to the needls 14, or by lowering the assembly of needles 14 into the fruit. The free ends of the needles 14 are thus caused to penetrate individual segments of the fruit and the operation is continued until the free ends of the needles extend outwardly beyond the fruit. Thereafter with the fruit supported on the needles, movable members 18 are caused to move outwardly along the guide arms 16. This causes the wire portions 22 to separate the juice cell groups from the radial membranes. Lateral movement of the outer ends of the wire portions 22 is permitted by the spring arm 20, which thus permits the separating portions to follow the membranes. As soon as the separating portions 22 have passed out of the fruit, the juice cell groups illustrated at 60 fall free and may be collected in a suitable receptacle. Thereafter the plunger 40 is caused to move upwardly through the space between the needles, ejecting the core and the attached radial membranes.

It will be observed that the radially extended portions 12 of the needles 14 leave relatively large segmental openings therebetween. Therefore if it so happens that a particular fruit has more segments than there are needles provided, it will be apparent that one or more of the segments will not be penetrated by a needle. The effect of this will be that these unpenetrated segments are not separated from their radial membranes but instead will be ejected with the core and remaining radial segments. The radial spaces between the portions 12 of the needles permit passage of such unseparated segments.

Referring now to Figures 4 and 5, there is illustrated a somewhat different embodiment of the invention. In this modification needles 60 are supported by radially extending portions 62 which are in turn connected to an annular supporting ring 64 carried at the lower end of a vertically extending tubular member 66. A generally dome-shaped cam 70 is mounted on shoulders provided on the tubular member. A slidable actuator 72 surrounds the tubular member 66 and is mounted for relative vertical movement with respect thereto. Actuator 72 is provided with a plurality of pins 74 by means of which wire actuating arms 76 are mounted, the upper ends of the arms 76 being formed with the hook-shaped portions for receiving the pins 74 as illustrated. Intermediate their lengths the arms 76 are provided with rollers 78 which are adapted to ride over the upper and outer surface of the camming dome. The dome 70 is provided with a plurality of slots 80 through which the lower portions of the arms 76 may extend. At the lower end of the arms 76 are provided blocks 82 which are mounted for rocking movement about pivot pins 84. Secured to the lower ends of the blocks 82 are resilient spring arms 86.

Intermediate the lower or free end of the needles 60 and the inner or free ends of the spring arms 86 are the wire portions 88. As in the embodiment previously described, the wire portions 88 may be separate or they may result from threading a single continuous wire back and forth between the free ends of the needles 60 and the free ends of the spring arms 86. The purpose of providing for rocking movement of the blocks 84 is to permit lateral movement of the outer free ends of the spring arms 86 out of the plane of movement of the actuating arms 76. This permits the wire separating portions to conform to the particular fruit so as to follow the radial membranes irrespective of the precise location of the membranes with respect to the planes of movement of the actuating arms 76.

Referring now to Figures 6 to 8, there are illustrated a number of different needles which may be employed in any of the modifications of the machines disclosed herein. In Figure 6 a needle 90 is disclosed which is of circular cross section and is provided with an opening or eye 92 adjacent its free end for receiving an intermediate part of a wire 94.

In Figure 7 the needle 96 is illustrated as of circular cross section but is provided with an inclined slot 98 for receiving the wire 99.

In Figures 8 and 9 there is illustrated yet another form of needle. In this figure the needle 100 is generally sector-shaped, as best seen in Figure 9. While this figure illustrates the needle 100 as provided with an inclined slot 102 for receiving the wire, it will be understood of course that it could, if desired, be provided with an opening or eye such as that shown at 92 in Figure 6. The purpose of providing the needle 100 with a generally sector-shaped cross section is to permit the provision of a relatively large number of needles in a relatively small annulus without at the same time sacrificing the desired strength and rigidity of the needles. A more important result, however, is the provision of the flat areas 103, which on adjacent needles engage the intermediate membranes over a substantial area, thus permitting gripping the membranes to provide adequate support without the possibility of pinching the membranes in two.

Referring now to Figures 10 through 12, there is illustrated a somewhat different embodiment of the present invention. In this case the needles 110 are provided with radially extending supporting elements 112 which are slidably mounted in guideways formed in an annular supporting structure 114 carried by the vertically extending tubular member 140. A separate removable annular bottom closure plate 118 is provided and the outer ends of the slots formed in the structure 114 may, if desired, be closed by a camming dome 120 substantially similar to that shown at 70 in the embodiment of the invention illustrated in Figure 5. Located within the slots 122 formed in the supporting structure 114 are compression springs 124 tending to urge the needles radially inwardly.

Vertically movable within the tubular support 116 is a camming plunger and locator 126. The lower end of the plunger 126 is reduced, as best illustrated in Figure 12, and is provided with a plurality of vertically extending recesses 128 into which the inner upper ends of the needles 110 seat to some extent and are thereby located and spaced. Preferably adjacent the upper ends of the needles 110 are a pair of projections 130 which normally engage the bottoms of the vertical recesses 128. The reduced portion 132 of the plunger 126 is provided with a pair of annular recesses 134 which are of slightly greater depth than the vertical recesses 128. Accordingly when the plunger 126 is moved upwardly from the position illustrated in Figure 12 so as to bring the projections 130 on the needles 110 into registry with the annular grooves 134, the needles 110 may move inwardly by an amount defined by the height of the projections 130.

Referring again to Figure 10, there is provided a vertically movable sleeve 140 on the tubular support 116 which is provided with a plurality of depending cam elements 142. The upper outer corners of the supporting elements 112 are beveled as indicated at 144 and the inner bottom corners of the cam elements 142 are correspondingly beveled as indicated at 146. While the compression springs 124 urge the needles 110 radially inwardly, the cam elements 142 serve to lock the needles rigidly in their inner position during portions of the operation of the apparatus.

In the operation of the embodiment of the invention illustrated in Figures 10 through 12, suitable means are provided for effecting relative vertical movement between the tubular support 116, the plunger 126, and the cam supporting sleeve 140. With the parts in the relative position illustrated in Figure 12, the needles are disposed in an annular array as seen in Figure 11 with an appreciable amount of space between adjacent needles. At this time the projections 130 on the needles are out of registry with the circumferential or annular grooves 134. This is the position of the needles at the time when they are to penetrate a peeled and prepared citrus fruit. At this time the needles are moved downwardly to penetrate the fruit. As each needle enters a segment of the fruit the double-walled radial membrane between adjacent segments will pass into the space between adjacent needles. Thereafter the plunger 126 is moved from the position illustrated in Figure 12 slidably upwardly to bring the projections 130 into registration with the grooves 134. This permits further inward movement of the needles and they may be clamped in such inward position by relative downward movement of the cam supporting sleeve 140. This inward movement of the needles causes the assembly to grip the core on the fruit more tightly and to some extent to grip the radially extending membrane. At this time the separating portions or wires are swung outwardly as in the embodiment previously disclosed, thus separating the segmental juice segments from the radial membranes. The separated segments will fall away from the assembly of needles into a suitable receptacle which will be provided. The core and the radial membranes will be retained. Thereafter the cam-supporting sleeve 140 is moved upwardly relative to the tubular support 116 to permit outward movement of the needles, and the plunger 126 moves downwardly and cams the needles outwardly to a separated position which permits the plunger 126 to expel the core and the attached radial membranes without difficulty.

The points of the needles are preferably sufficiently sharp to penetrate the fruit cell segments without difficulty but the ends are somewhat blunt so as to avoid any tendency for the free ends of the needles to penetrate a radial membrane. Thus even though a fruit may be accidentally placed on the support below the needles somewhat out of alignment, there will be a tendency for the ends of the needles to follow along the inner surface of a radial membrane so as to remain within a single juice cell group.

While the essential features of the invention may be embodied in relatively simple structure requiring considerable hand operation, it is preferred to employ automatic means for effecting the several necessary relative movements. A complete cycle of the machine may be entirely automatic and require only the placing of the peeled and prepared citrus fruit in the cup 36. In a preferred machine embodiment the cup 36 thereafter moves upwardly, causing the needles and wires to penetrate completely through the fruit. Thereafter the needles may be caused to move inwardly to grip the core, and the cup 36 may move downwardly out of the way. Thereafter wires are swung radially outwardly and follow the radial membranes, the necessary lateral movement of the wires being permitted by the provision of spring arms such as 20 or equivalent means such as the pivoted blocks 32. As the wires move out of the fruit, the separated juice cell segments 60 drop out freely. Thereafter where the needle adjusting structure shown in Figures 10 to 12 is employed, the needles move outwardly to release their grip on the core and attached radial membranes while at the same time the core and attached membranes are expelled by movement of the plunger 126. Upward movement of the plunger 126 to the position shown in Figure 10 permits inward movement of the needles to their intermediate position as defined by the height of the projections 130, and the needles are rigidly locked in adjusted position by the camming elements 142. The camming elements 142 insure that the upper ends of the needles are seated in the vertical grooves or recesses 128 and accordingly insure uniform and predetermined spacing of the needles. This conditions the apparatus for the next manual step of the operation which is the placing of a second previously peeled and prepared fruit on the cup.

It will be understood that where the term "wire portion" is used in the specification and claims, it is intended to refer to and define a portion of a wire extending between a needle 14 and an adjacent movable member 18, whether this wire portion is provided by a short, separate wire secured at its ends to the needle and member; or is a double wire secured at its ends to two adjacent needles 14 and at its midportion to a single movable member 18; or is a double wire secured at its ends to two adjacent movable members 18 and at its mid-portion to a single needle 14; or is a continuous wire extending back and forth alternately between a plurality of movable members 18 and a plurality of needles 14.

It is within the contemplation of my invention to use non-metallic separating portions in lieu of metallic wire portions. Thus, woven or twisted strands of fibers of vegetable origin such as ramie may be employed. Moreover, I may employ synthetic plastic strands which may be formed either as an extruded monofil or as a woven or twisted strand of fibers; the polyamides or polymeric amides of the type disclosed in United States Patents 2,071,253, 2,188,332, 2,191,556 and 2,298,868 are an example of such plastic strands. Non-metallic strands when employed in my invention should be characterized by toughness, tensile strength, elasticity, and resistance to corrosion or abrasion.

While the invention has so far been described in connection with separating whole juice cell segments from a whole fruit, it will be apparent that if desired the apparatus will operate equally well to separate half segments, provided the fruit is previously cut into halves perpendicular to its core.

The drawings and the foregoing specification constitute a description of the improved apparatus for preparing citrus fruit in such full, clear, concise and exact terms as to enable any person skilled in the art to practice the invention, the scope of which is indicated by the appended claims.

What I claim as my invention is:

1. In apparatus of the character described, a plurality of needles disposed in parallelism in an annular series, guide means for said needles mounting said needles for radial in and out movement, and needle control means for moving said needles in and out between an inner position in which the needles support the core and radial membranes of a citrus fruit and an outer position in which the needles are spaced to facilitate withdrawal of the core and radial membranes of a citrus fruit after separation of the segmental fruit cell groups therefrom, said needle control means comprising resilient means urging said needles inwardly, and other means for moving said needles outwardly, said other means comprising a plunger reciprocable through the said needles to expel the core and attached radial membranes, said plunger having camming surfaces for effecting in and out movement of said needles, said plunger having a portion provided with spaced recesses for receiving and locating the supported ends of said needles, and clamping means for locking said needles in engagement with said plunger.

2. In apparatus of the character described, means for supporting a pair of wire portions at one end, movable means for supporting the opposite ends of said wire portions, said movable means being movable in planes radial of said first means and including tension means for keeping said wire portions under tension, and means providing for movement of the movable ends of said wire portions laterally of the planes of movement of said movable means, said last means comprising spring arms, and means mounting said spring arms for pivotal movement transversely of the planes of movement of said movable means.

3. In apparatus of the character described, a plurality of generally parallel needles disposed in an annular series, annular support means for said needles, said needles having radially outwardly extending portions at one end carried by said support means, and defining segmental openings between said portions, pairs of wire portions secured adjacent the free ends of each of said needles, and movable members connected to the wire portions from each of two adjacent needles, support means for said movable members supporting the same for movement in arcuate paths from a position close to the supported ends of said needles to a position spaced radially outward from said needles to swing said wire portions outwardly away from the needles to which they are secured.

4. Apparatus for separating segmental juice cell groups from radial membranes of citrus fruit, comprising a plurality of generally parallel needles in an annular array, a pair of flexible wire separating portions secured adjacent the end of each needle, a plurality of movable members, the opposite ends of said wire portions being supported by said members, with one wire from each of two adjacent needles being secured to each of said movable members, means for swinging said members outwardly in radial planes, the paths of swinging of said members being angularly spaced about the axis of said array of needles to correspond substantially to the average transverse angular extent of a fruit segment, means maintaining said wire portions under tension, said last means being yieldable to permit the pair of wire portions to bow outwardly around any segment which is not penetrated by a needle.

5. Apparatus for separating segmental fruit cell groups from the radial membranes of citrus fruit comprising a needle adapted to penetrate a fruit segment parallel to and adjacent the apex thereof, and a pair of flexible wire portions carried by said needle adjacent its free end to be carried thereby through the segment, means for swinging said portions outwardly away from said needle to separate the fruit cell group from the radial membranes at both sides thereof, the paths of swinging of said means being angularly spaced about the axis of the fruit to correspond substantially to the average transverse angular extent of a fruit segment, and means for maintaining said portions under tension, said last means comprising yieldable resilient means permitting lateral movement of said wire portions to follow the planes of cleavage between the fruit cell group and radial membranes.

6. In apparatus of the character described, a separating device comprising a section of wire doubled to provide two interconnected straight wire portions connected by a doubled part, means for inserting the doubled part of said wire through a segment of citrus fruit, parallel and adjacent to its apex, support means supporting the doubled part of said wire in fixed position after it has passed through the segment, members engaging said wire portions at points at the opposite side of the fruit, and means for moving said members outwardly in diverging planes parallel to the sides of the segment to swing said portions outwardly about the support means, the paths of movement of said members being angularly spaced to correspond substantially to the transverse angular extent of a fruit segment.

7. Apparatus for separating segmental juice cell groups from the radial portions of the membrane normally enveloping each segment of citrus fruit which has previously been treated to remove the rind and the outer portions of said membrane, which comprises an annular array of generally parallel needles having free ends disposed to penetrate the fruit to surround its core with said needles extending through individual segments adjacent the apices thereof, a pair of wire portions supported at their ends adjacent the free end of each of said needles and disposed to be generally parallel to said needles and to be drawn through the fruit thereby, said wire portions being of a length such that when the ends thereof supported adjacent the free ends of the needles have been drawn through the fruit the other ends remain outside the fruit, movable means supporting the said other ends of said wire portions for outward swinging in planes radial of said annular array in generally arcuate paths centered at the points of connection of said wire portions to said needles, the paths of swinging of said means being angularly spaced about the axis of the fruit to correspond substantially to the average transverse angular extent of a fruit segment.

8. Apparatus as defined in claim 7 in which said movable means comprises a plurality of members corresponding in number to the number of needles, each member being connected to a wire portion from each of two adjacent needles.

9. Apparatus as defined in claim 7, comprising tension means for maintaining said wire portions under tension during outward swinging of said members.

10. Apparatus as defined in claim 9, said tension means comprising springs connecting said other ends of said wire portions to said members effective to provide for limited lateral movement from said arcuate paths of the said other ends of said wire portions to permit said wire portions to follow the inner surfaces of fruit membranes of irregularly spaced segments.

11. Apparatus as defined in claim 7 comprising guide means supporting said needles for movement radially of said annular array while maintaining said needles in parallelism between an inner position in which the needles are in a parallel annular array of smaller diameter and support the core and radial membranes of a citrus fruit and an outer position in which the needles are in a parallel array of larger diameter and are spaced to facilitate withdrawal of the core and radial membranes of a citrus fruit after separation of the segmental fruit cell groups therefrom.

12. Apparatus as defined in claim 11 comprising resilient means urging said needles radially inwardly, and cam means for moving said needles radially outwardly against the action of said resilient means.

13. Apparatus as defined in claim 12 comprising a plunger movable axially through said annular array, said cam means being provided on said plunger.

14. In apparatus of the character described, a plurality of needles disposed in parallelism in an annular array, guide means for supporting said needles at one end thereof and mounting said needles for radial in and out movement while maintaining said needles in parallelism to vary the diameter of said annular array, and needle control means for moving said needles in and out between an inner position in which the needles support the core and radial membranes of a citrus fruit and an outer position in which the needles are spaced to facilitate withdrawal of the core and radial membranes of a citrus fruit after separation of the segmental fruit cell groups therefrom, severing members connected to said needles and movable outwardly therefrom in planes radial to said annular array to sever a fruit cell group from a radial membrane, said needle control means comprising resilient means urging said needles inwardly, and other means for moving said needles outwardly, said other means comprising a plunger reciprocable through the said array from the supported end thereof to expel the core and attached radial membrane, said plunger having camming surfaces on said plunger cooperating with said resilient means to effect in and out movement of said needles.

15. Apparatus as defined in claim 14, said camming surfaces being shaped to position said needles in annular array of two different diameters while said plunger is at the supported end of said needles, said plunger being movable to cam said needles outwardly into an array of larger diameter prior to piercing a fruit, and movable thereafter to cam said needles inwardly into an array of smaller diameter to press said needles into the apices of the membranes at each side of a fruit cell and more firmly grip the core of the fruit prior to separation of the segmental fruit cell groups therefrom, said camming surfaces being effective to cam said needles outwardly upon movement of said plunger through said array to release the core and attached radial membranes of the fruit for expulsion by said plunger.

16. Apparatus as defined in claim 14, said needles having inwardly projecting cam followers, said plunger having a reduced end portion having elongated axially extending recesses in which said followers seat to form an array of intermediate diameter, the recesses having pockets therein into which said followers may seat to provide an annular array of minimum diameter, said plunger having a generally conical portion inwardly of its reduced end portion effective to cam said needles outwardly into an annular array of maximum diameter as said plunger is moved axially through the array of needles.

17. In apparatus of the character described, a needle adapted to penetrate a citrus fruit segment along a line parallel and close to its apex, a pair of flexible wire portions secured adjacent the free end of the needle and adapted to be drawn through the fruit segment parallel and closely adjacent to said needle, the wire portions being of such length that when the ends thereof secured adjacent the free end of the needle have been drawn through the fruit the opposite ends thereof remain at the opposite side of the fruit, means for maintaining said wire portions under tension and means for swinging said opposite ends of said wire portions outwardly in planes generally radial of said needle and in arcuate paths generally concentric with the point of attachment of said wire portions to said needle, said radial planes being closely adjacent to the planes containing the sides of the fruit segment.

18. A device for removing the membranous covering from segments of citrus fruit which comprises a circular perforate base, a plurality of needles vertically mounted on said base and forming an annular ring of needles, a plurality of guide members attached at their upper ends to said base and having their lower ends spaced radially outwardly from said needles a distance approximately the same as the length of said needles, slidable blocks mounted on said guide members and wires connected between said slidable blocks and the lower portions of said needles.

19. A device for removing fruit segments from a peeled citrus fruit, comprising a plurality of needles disposed in parallelism in a circular array of a size to enter the apices of citrus fruit segments, all of said needles being supported at one end and having the free end shaped to penetrate the fruit, a pair of wire portions secured at one end to the free end of each of said needles, a plurality of movable members, means mounting said members for relative outward movement from a position close to the supported ends of said needles to a position spaced approximately radially outward from the free ends of said needles, the pair of wire portions secured at one end to one needle being secured at their other ends to two adjacent movable members.

20. A device as defined in claim 19 in which the means mounting said movable members comprises generally arcuate guides having centers of curvature substantially adjacent the free ends of the needles carrying the wire lengths connected to the movable members.

21. A device as defined in claim 19 in which resilient members are interposed between each of said movable members and the ends of the wire lengths connected thereto.

22. A device a defined in claim 21 in which the resilient members comprise spring arms secured at one end to said members and connected at the other ends to said wire lengths.

23. A device as defined in claim 19 in which said needles are provided with blunt heads at their free ends.

24. A device as defined in claim 19 in which the two wire lengths connected to each needle are parts of the same wire.

25. A device as defined in claim 19 in which each needle at its supported end includes a lateral extension, the lateral extensions of said needles being disposed to extend generally radially outward from the circular array of needles, and a needle supporting ring to which the outer end of said lateral extensions of said needles are secured.

26. A device for segmenting citrus fruit comprising a base ring, a plurality of needles carried by said ring, said needles having supporting portions mounted on said ring and disposed to extend radially inwardly thereof and penetrating portions disposed at right angles to said ring in mutual parallelism in a circular array, guide bars equal in number to the number of needles secured to said ring, said bars being generally arcuate and having approximate centers of curvature adjacent the free ends of the adjacent needles, movable members on said bars, and two wire lengths connecting the free end of each needle with each of the two adjacent movable members.

27. A device as defined in claim 26 in which the connection of each wire length to each movable member comprises a resilient member.

28. In apparatus of the character described, a plurality of needles disposed in parallelism in an annular array, means carried by said needles for separating segmental fruit cell groups from the radial membranes, support means for said needles supporting the same for movement radially of said annular array while maintaining said needles in parallelism to vary the diameter of said annular array, and means for effecting radial in and out movement of said needles.

29. In apparatus of the character described, a plurality of needles disposed in parallelism in an annular array, means carried by said needles for separating segmental fruit cell groups from the radial membranes, support means for said needles supporting the same for movement radially of said annular array while maintaining said needles in parallelism to vary the diameter of said annular array, and mechanism for moving said needles radially in and out between an inner position in which the needles support the core and radial membranes of a citrus fruit during the separating of the fruit cell groups therefrom, and an outer position in which the needles are spaced to facilitate withdrawal of the core and radial membranes after the separating operation, said mechanism including means operative to retain said needles in an intermediate radial position spaced slightly outwardly from the inner position aforesaid for the fruit piercing operation.

30. A device as defined in claim 19 wherein the said wire portions are formed from material of vegetable origin.

31. A device as defined in claim 19 wherein the said wire portions are formed from synthetic plastic material.

32. A device as defined in claim 19 wherein the said wire portions are in the form of metal strands.

33. In apparatus of the character described, means for supporting a pair of wire portions at one end, movable means for supporting the opposite ends of said wire portions, said movable means being movable in planes radial of said first means and including tension means for keeping said wire portions under tension, and means providing for movement of the movable ends of said wire portions laterally of the planes of movement of said movable means, said last means comprising arms, and means mounting said arms for movement laterally of the planes of movement of said movable means.

WENDELL A. BODEN.

REFERENCES CITED

The following references are of record in the file of this patent:

UNITED STATES PATENTS

| Number | Name | Date |
|---|---|---|
| 593,496 | Saunders | Nov. 9, 1897 |
| 863,881 | Sanderson | Aug. 20, 1907 |
| 1,027,972 | Ashton | May 28, 1912 |
| 2,071,853 | Randall et al. | Feb. 23, 1937 |
| 2,085,372 | Lenk | June 29, 1937 |
| 2,121,097 | Polk et al. | June 21, 1938 |
| 2,121,098 | Polk et al. | June 21, 1938 |
| 2,129,191 | Polk, Jr. | Sept. 6, 1938 |
| 2,240,908 | Polk, Sr., et al. | May 6, 1941 |
| 2,243,025 | Wilson | May 20, 1941 |
| 2,246,896 | Polk, Sr., et al. | June 24, 1941 |
| 2,301,289 | Knepper | Nov. 10, 1942 |
| 2,396,444 | Singer | Mar. 12, 1946 |